(12) United States Patent
Hirota et al.

(10) Patent No.: US 6,957,663 B2
(45) Date of Patent: Oct. 25, 2005

(54) SOLENOID CONTROL VALVE

(75) Inventors: Hisatoshi Hirota, Tokyo (JP); Yuusuke Inoue, Tokyo (JP); Toshiyuki Shiota, Tokyo (JP); Tokumi Tsugawa, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 50 days.

(21) Appl. No.: 10/359,822

(22) Filed: Feb. 7, 2003

(65) Prior Publication Data

US 2003/0201413 A1 Oct. 30, 2003

(30) Foreign Application Priority Data

Apr. 26, 2002 (JP) .............................. 2002-125365

(51) Int. Cl.[7] ...................... F16K 31/40; F15B 13/043; F25B 41/06
(52) U.S. Cl. .................... 137/613; 137/491; 251/30.01; 251/129.08; 251/129.18
(58) Field of Search ................................ 137/488, 491, 137/492.5, 613; 251/30.01, 129.08, 129.15

(56) References Cited

U.S. PATENT DOCUMENTS

| | | | | |
|---|---|---|---|---|
| 4,493,474 A | * | 1/1985 | Ohyama ................ 251/129.01 |
| 4,535,805 A | * | 8/1985 | Mertz ......................... 137/489 |
| 4,592,533 A | * | 6/1986 | Guglielmi et al. ....... 251/30.01 |
| 4,623,118 A | * | 11/1986 | Kumar .................... 251/30.01 |
| 6,021,996 A | | 2/2000 | Nakayoshi | |
| 6,315,266 B1 | * | 11/2001 | Hirota et al. ............ 251/30.01 |
| 6,328,275 B1 | * | 12/2001 | Yang et al. .............. 251/30.03 |

FOREIGN PATENT DOCUMENTS

| DE | 44 42 085 A1 | * | 6/1995 |
|---|---|---|---|
| EP | 1 069 359 A2 | * | 1/2001 |

* cited by examiner

Primary Examiner—Ramesh Krishnamurthy
(74) Attorney, Agent, or Firm—Patterson, Thuente, Skaar & Christensen, P.A.

(57) ABSTRACT

The object of the present invention is to provide a solenoid control valve simple in construction and low in cost, realized by reducing the number of component parts, eliminating screw-joined portions, and minimizing the use of rubber O rings. A valve hole of a pilot valve, a hole of a bearing for supporting one end of a shaft of a solenoid, and a fitting hole in which is fitted one end of a sleeve, are formed along the same axis in a body. This makes it possible to accurately establish the concentricity of movable components of the solenoid when the sleeve is fitted in the fitting hole, and hence, a pilot valve element can be integrally formed with the shaft. Set values for a main valve and the pilot valve are adjusted by adjusting the amounts of insertions of a press-fit member and a bearing by press-fitting. At the same time, a space below a piston and an end of a hole through a core are closed by the press-fit members and the solenoid and the body are joined to each other by caulking a yoke to thereby eliminate screw portions, and minimize rubber sealed portions.

22 Claims, 9 Drawing Sheets

SOLENOID CONTROL VALVE

CROSS-REFERENCES TO RELATED APPLICATIONS, IF ANY

This application claims priority of Japanese Application No. 2002-125365 filed on Apr. 26, 2002 and entitled "Solenoid Control Valve".

BACKGROUND OF THE INVENTION (1) Field of the Invention

This invention relates to a solenoid control valve, and more particularly to a pilot-operated solenoid control valve for controlling a flow rate of refrigerant such that a differential pressure across the valve becomes equal to a differential pressure set by a solenoid.

(2) Description of the Related Art

A refrigeration cycle e.g. of an automotive air conditioning system is known which condenses or cools high-temperature and high-pressure gaseous refrigerant compressed by a compressor by a condenser or gas cooler, changes the condensed or cooled refrigerant into low-temperature and low-pressure refrigerant by a pressure-reducing device, evaporates the low-temperature refrigerant by an evaporator, separates the evaporated refrigerant into gas and liquid by an accumulator, and returns gaseous refrigerant obtained by the separation to the compressor. As the pressure-reducing device of the system, a pilot-operated solenoid control valve is used which is capable of controlling a flow rate of refrigerant by an electric current externally supplied.

The conventional pilot-operated solenoid control valve is comprised of a body containing a main valve and a pilot valve, and a solenoid for actuating the pilot valve. The solenoid is configured such that a shaft supporting a plunger is supported by two-point support at both ends thereof so as to prevent the plunger from sliding on the sleeve containing the same. To this end, bearings supporting the shaft are arranged on the same axis as that of the sleeve, and designed such that a clearance between the bearings and the shaft is small, with a view to prevention of the shaft from being inclined. A hysteresis characteristic exhibited when an electric current supplied to the solenoid is increased and decreased is reduced by the above configuration.

On the other hand, the pilot valve arranged in the body includes, for instance, a ball-shaped pilot valve element. This pilot valve element is held on an end of the shaft supported by the body in a manner movable forward and backward. The driving force of the solenoid is transmitted to the pilot valve element via the shaft of the solenoid and the shaft of the pilot valve.

Here, in the above solenoid control valve, to transmit the driving force of the solenoid to the pilot valve element, two shafts are interposed between the solenoid and the pilot valve. This is for the following reason: On the solenoid side, to support the plunger in a manner movable forward and backward on the same axis as that of the sleeve, it is necessary to arrange two bearings on the same axis as that of the sleeve. Further, when the solenoid is joined to the body containing the main valve and the pilot valve, since the axis of the shaft of the solenoid and the axis of the shaft of the pilot valve are not accurately aligned with each other, the shaft is divided for absorbing the misalignment of the respective axes of the shafts at the divided portions, so as to subsequently transmit the driving force of the solenoid to the pilot valve.

Further, in the conventional solenoid control valve, the assembly of component parts and adjustment thereof are carried out by using screws, and sealing thereof is effected by using rubber O rings. For instance, the solenoid and the body have fitting portions formed with screw threads, and they are joined to each other by screwing the solenoid into the body. Further, a set value for the solenoid control valve is adjusted by adjusting the load of a spring urging the main valve. This adjustment is normally carried out by adjusting the amount of screwing of an adjusting screw. Similarly, in the solenoid as well, the load of a spring urging the plunger in a direction away from a core is adjusted by adjusting the amount of screwing of an adjusting screw receiving one end of the spring.

In the conventional solenoid control valve, however, the solenoid is configured such that the hysteresis is reduced by its own configuration, and when the solenoid is screwed into the body, the shaft holding the pilot valve element is driven by the shaft of the solenoid. To realize the above construction, it is necessary to provide a portion for receiving the bearing for supporting one end of the shaft of the solenoid, and portions of the solenoid and the body via which the solenoid screwed into the body to connect them. Further, to transmit the force of the solenoid to the pilot valve element, it is necessary to provide two shafts. Thus, an increased number of component parts is required, which increases the manufacturing costs of the solenoid control valve.

Further, the portions of the solenoid and the body via which they are joined, and portions of the body and the solenoid in which adjusting screws for adjusting the loads of the springs are inserted require machining of screws, which hinders reduction of the manufacturing costs of the solenoid control valve.

Further, although the above joining portions are sealed by rubber O rings, it is known that refrigerant permeates the rubber O rings to leak outside the sealed portions depending on the refrigerant used. Therefore, there is a demand for minimizing the use of rubber O rings for sealing.

SUMMARY OF THE INVENTION

The present invention has been made in view of the above circumstances, and an object thereof is to provide a solenoid control valve simple in construction and low in cost, realized by reducing the number of component parts, eliminating screw-joined portions machining cost of which is high, and minimizing the use of rubber O rings.

To solve the above problem, the present invention provides a solenoid control valve of a pilot-operated type for controlling a flow rate of refrigerant such that a differential pressure of a fluid between an inlet and an outlet becomes equal to a differential pressure set based on a value of an electric current caused to flow through the solenoid, characterized in that a shaft of the solenoid for actuating a pilot valve and a pilot valve element are integrally formed with each other, the shaft having both ends thereof supported by a first bearing arranged on a side of a body containing a main valve, and a second bearing arranged within the solenoid.

According to this solenoid control valve, the shaft of the solenoid and the pilot valve element of the pilot valve are integrally formed with each other, whereby it is possible to decrease the number of component parts, thereby reducing the manufacturing costs of the solenoid control valve.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 8(A) and 8(B) are cross-sectional views showing essential elements of the FIG. 7 solenoid control valve, in which:

FIG. 8(A) is a cross-sectional view of the solenoid control valve taken on line a—a of FIG. 7; and FIG. 8(B) is a cross-sectional view of the same taken on line b—b of FIG. 8(A);

FIGS. 9(A) and 9(B) are diagrams which are useful in explaining operations of the solenoid control valve according to the seventh embodiment of the invention, in which:

FIG. 9(A) illustrates an operation of the solenoid control valve in a first direction of flow of refrigerant; and FIG. 9(B) illustrates an operation of the solenoid control valve in a second direction of flow of refrigerant.

DESCRIPTION OF THE PREFERRED EMBODIMENTS

Hereinafter, embodiments of the present invention will be described in detail with reference to drawings. In the embodiment, a solenoid control valve according to the invention is applied to an expansion valve used in a refrigeration cycle of an automotive air conditioning system as a pressure-reducing device, by way of example.

Figure 1:
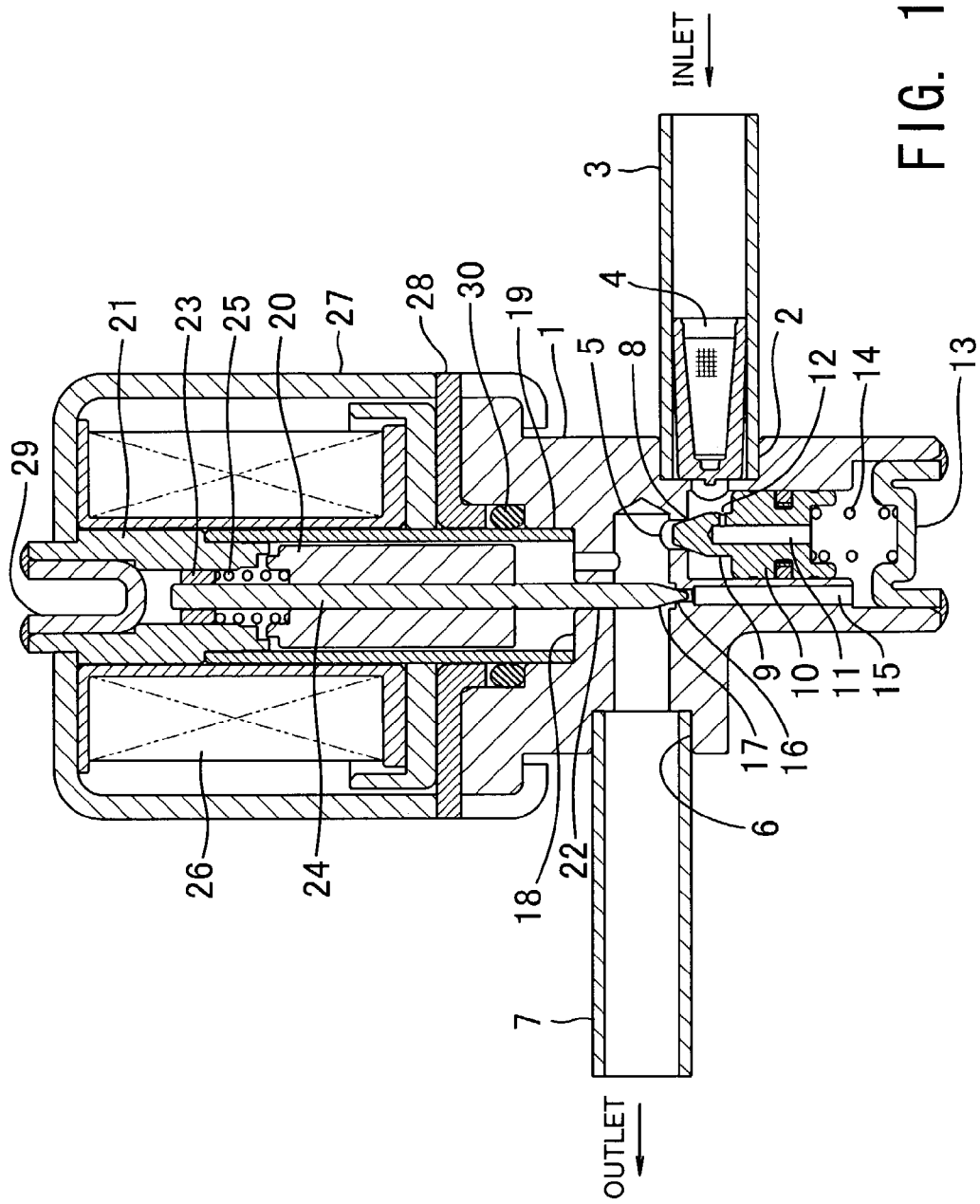
FIG. 1 is a longitudinal sectional view showing the construction of a solenoid control valve according to a first embodiment of the invention.

FIG. 1 is a longitudinal sectional view showing the construction of the solenoid control valve according to a first embodiment of the invention.

The solenoid control valve according to the present invention has an inlet port 2 opening in a side surface of a body 1 thereof, for receiving high-pressure refrigerant. To the inlet port 2 is welded a refrigerant piping 3 which has a strainer 4 arranged therein such that the strainer 4 blocks a passage of the piping 3. The inlet port 2 is communicated with an outlet port 6 via a refrigerant passage 5. The outlet port 6 has a refrigerant piping 7 welded thereto. In an intermediate portion of the refrigerant passage 5, a main valve seat 8 is integrally formed with the body 1. A main valve element 9 is arranged in a manner opposed to the main valve seat 8 from the upstream side of a main valve, for forming the main valve together with the main valve seat 8. The main valve element 9 is integrally formed with a piston 10 which defines a chamber for introducing refrigerant together with the main valve seat 8. The piston 10 is arranged in a manner movable forward and backward such that the main valve element 9 can move toward and away from the main valve seat 8, and has a refrigerant passage 11 formed along a central axis thereof. The refrigerant passage 11 is communicated with an orifice 12 which laterally extends through the main valve element 9 to the refrigerant passage 11. The refrigerant passage 11 and the orifice 12 form a restricted passage which allows high-pressure refrigerant introduced into the chamber formed on an upper side of the piston 10, as viewed in the figure, to be reduced its pressure and to flow into a space formed on a lower side of the piston 10, as viewed in the figure. The space formed on the lower side of the piston 10, as viewed in the figure, is closed by a press-fit member 13, and between the piston 10 and the press-fit member 13, there is arranged a spring 14 for urging the piston 10 in a main valve-closing direction. The press-fit member 13 has a lower end portion thereof, as viewed in the figure, welded to the body 1 after adjusting the load of the spring 14 by the amount of insertion thereof by press-fitting.

A chamber defined by the piston 10 and the press-fit member 13 is communicated with the downstream side of the main valve, that is, a space communicating with the outlet port 6 via a refrigerant passage 15 formed in the body 1. A pilot valve seat 16 is formed at a location between the refrigerant passage 15 and the space. A pilot valve element 17 in the form of a needle is arranged in a manner opposed to the pilot valve seat 16 from a downstream side thereof, thereby forming a pilot valve together with the pilot valve seat 16.

A solenoid for controlling the pilot valve is arranged on an upper portion of the body 1. The solenoid is comprised of a sleeve 19 which has a lower end portion thereof fitted in a fitting hole 18 formed in the upper portion of the body 1, a plunger 20 arranged within the sleeve 19 in a manner axially movable forward and backward, a hollow cylindrical core 21 fitted in an upper end of the sleeve 19, a shaft 24 which is fixedly arranged in the plunger 20 and axially extends therethrough, with a lower end thereof supported by a bearing 22 formed in the body 1 and an upper end thereof supported by a bearing 23 press-fitted in a hole axially formed through the core 21, a spring 25 which is arranged between the plunger 20 and the bearing 23, for urging the pilot valve element 17 in a valve-closing direction via the shaft 24, a solenoid coil 26 arranged outside the sleeve 19, a yoke 27 formed in a manner surrounding the outside of the solenoid coil 26, and a plate 28 arranged between the yoke 27 and the sleeve 19 to establish a magnetic circuit. The hole through the core 21 has an end thereof closed by a press-fit member 29, and the end of the hole and the end of the press-fit member 29 are sealed by welding. A rubber O ring 30 is arranged in a space surrounded by the body 1, the sleeve 19, and the plate 28.

The shaft 24 of the solenoid is integrally formed with the pilot valve element 17. A valve hole of the pilot valve, a hole of the bearing 22, and the fitting hole 18 for having the sleeve 19 fitted therein are formed in the body 1, all along the same axis. As a result, differently from a case where the shaft 24 and the pilot valve element 17 are formed as separate members, they are arranged on substantially the same axis, and by fitting the sleeve 19 having the shaft 24 arranged therein on the same axis in the fitting hole 18, the pilot valve element 17, as a separate member, which is integrally formed with an end of the shaft 24, can be guided to the valve hole of the pilot valve, which is formed along substantially the same axis as that of the pilot valve element 17. Further, the hole of the bearing 22 is configured such that a clearance between the bearing 22 and the shaft 24 is slightly larger than that between the bearing 23 and the shaft 24. However, the clearance is set to be of such a size as will prevent the plunger 20 from abutting with the sleeve 19 even when the shaft 24 is inclined on the bearing 23 as a fulcrum, whereby the solenoid control valve according to the present embodiment is prevented from being degraded in hysteresis characteristic. The load of the spring 25 arranged between the plunger 20 and the bearing 23 is adjusted by adjusting the amount of insertion of the bearing 23 into the core 21 by press-fitting. Further, the solenoid is secured to the body 1 by caulking a lower end of the yoke 27 to a flange formed on the upper portion of the body 1.

In the solenoid control valve constructed as above, first, when the solenoid coil 26 is not energized and hence no refrigerant is introduced into the inlet port 2, the main valve element 9 is seated on the main valve seat 8 by the spring 14 to place the main valve in its closed state. The pilot valve element 17 as well is seated on the pilot valve seat 16 by the spring 25 contained in the solenoid to place the pilot valve in its closed state.

Now, when high-pressure refrigerant is introduced into the inlet port 2, the refrigerant is guided into the chamber above the piston 10. Then, the refrigerant is introduced into the chamber below the piston 10 via the orifice 12 of the main valve element 9 and the refrigerant passage 11 of the piston 10, and further supplied to the pilot valve via the refrigerant passage 15 formed in the body 1. When a differential pressure across the pilot valve exceeds a predetermined value, the refrigerant pushes open the pilot valve element 17 to flow into a space communicating with the outlet port 6. Since this reduces pressure in the chamber below the piston 10, the piston 10 is moved downward, as viewed in the figure, so that the main valve element 9 is moved away from the main valve seat 8 to open the main valve, whereby the refrigerant introduced into the inlet port 2 flows out through the main valve into the outlet port 6.

As the refrigerant flows out into the outlet port 6 to thereby reduce a refrigerant pressure on the upstream side of the main valve, the pressure of refrigerant supplied to the pilot valve is also reduced, and the pilot valve element 17 is moved in a valve-closing direction. This increases the pressure of refrigerant introduced into the chamber below the piston 10, to thereby move the piston 10 upward, as viewed in the figure. Since the main valve element 9 is urged in a valve-closing direction by the upward movement of the piston 10, the main valve reduces the flow rate of refrigerant to increase the pressure of refrigerant on the upstream side of the main valve. The above operations are repeatedly carried out to thereby control a differential pressure across the main valve to a fixed value. The differential pressure across the main valve is determined based on the load of the spring 25 in the solenoid.

Further, when the solenoid coil 26 is energized, the plunger 20 is attracted toward the core 21, and the spring force of the spring 25 urging the pilot valve element 17 in the valve-closing direction is reduced to decrease the differential pressure set to the pilot valve. When the value of an electric current energizing the solenoid coil 26 is increased, a force for attracting the plunger 20 to the core 21 is increased, whereby it is possible to further decrease the differential pressure set to the pilot valve, that is, a differential pressure across a differential pressure valve.

Figure 2:
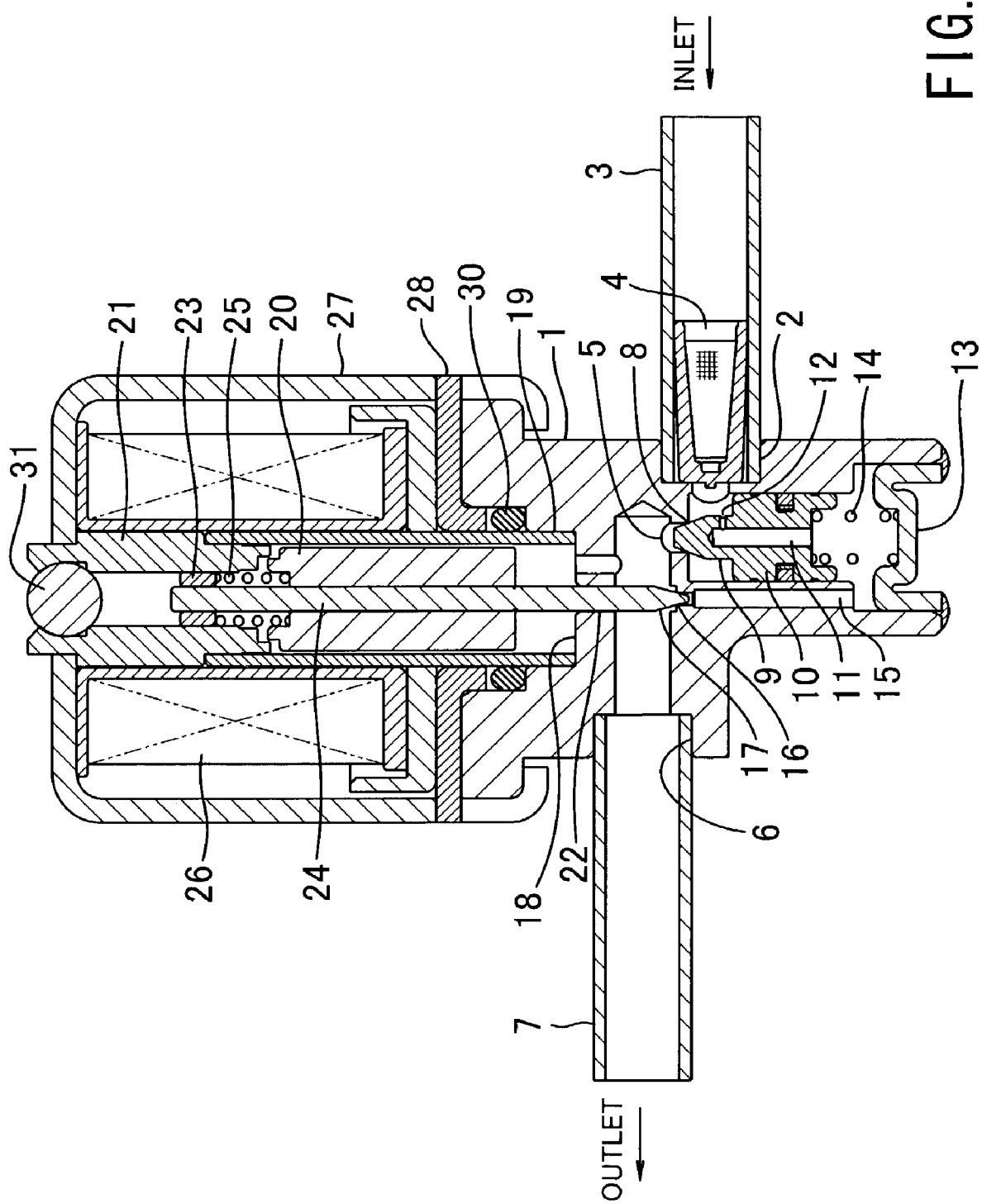
FIG. 2 is a longitudinal sectional view showing the construction of a solenoid control valve according to a second embodiment of the invention.

FIG. 2 is a longitudinal sectional view showing the construction of a solenoid control valve according to a second embodiment of the invention. In the figure, component parts and elements similar to those of the FIG. 1 solenoid control valve are designated by identical reference numerals, and detailed description thereof is omitted.

The solenoid control valve according to the second embodiment employs an inexpensive ball 31 for sealing the solenoid from outside in place of the press-fit member 29 used in the solenoid control valve according to the first embodiment.

More specifically, a hole through a central portion of a core 21 is closed by press-fitting the ball 31 in an end of the hole, and the ball 31 is rigidly fixed to the core 21 by caulking an end of the core 21. Thus, the solenoid is sealed from outside. The other configurations and the operations of the solenoid control valve according to the second embodiment are similar to those of the solenoid control valve according to the first embodiment.

Figure 3:
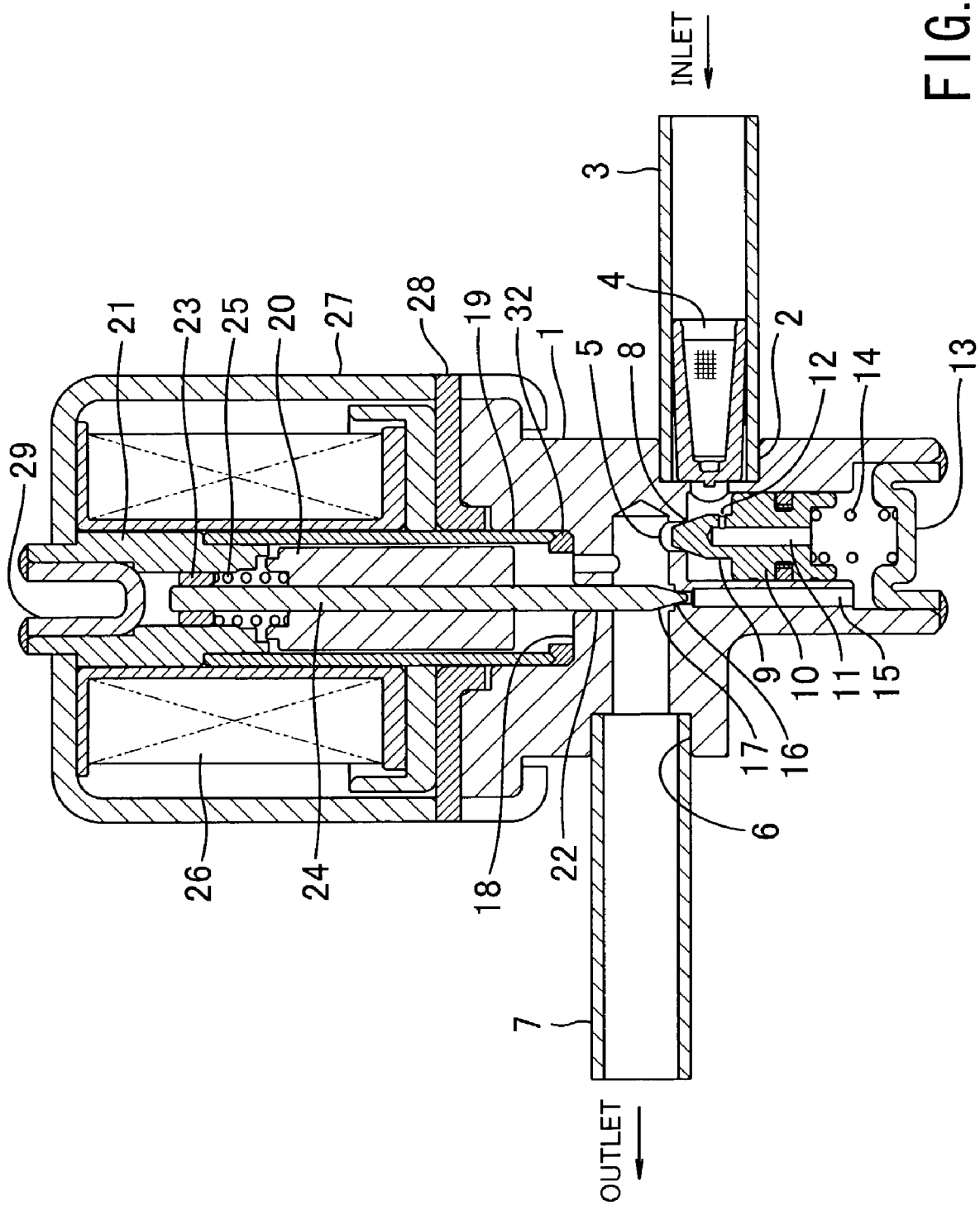
FIG. 3 is a longitudinal sectional view showing the construction of a solenoid control valve according to a third embodiment of the invention.

FIG. 3 is a longitudinal sectional view showing the construction of a solenoid control valve according to a third embodiment of the invention. In the figure, component parts and elements similar to those of the FIG. 1 solenoid control valve are designated by identical reference numerals, and detailed description thereof is omitted.

The solenoid control valve according to the third embodiment employs a packing 32 in place of the O ring 30 used in the solenoid control valve according to the first embodiment, whereby a juncture between the solenoid and a body 1 is sealed.

More specifically, the packing 32 having an annular shape is arranged on a bottom of a fitting hole 18, and when a sleeve 19 is fitted in the fitting hole 18, it is press-fitted against the bottom by an end of the sleeve 19 formed in an acute angle, thereby effecting seal from outside. The packing 32 can be made of polytetrafluoroethylene, or a soft metal, such as copper or aluminum. The other configurations and the operations of the solenoid control valve according to the third embodiment are the same as those of the solenoid control valve according to the first embodiment.

Figure 4:
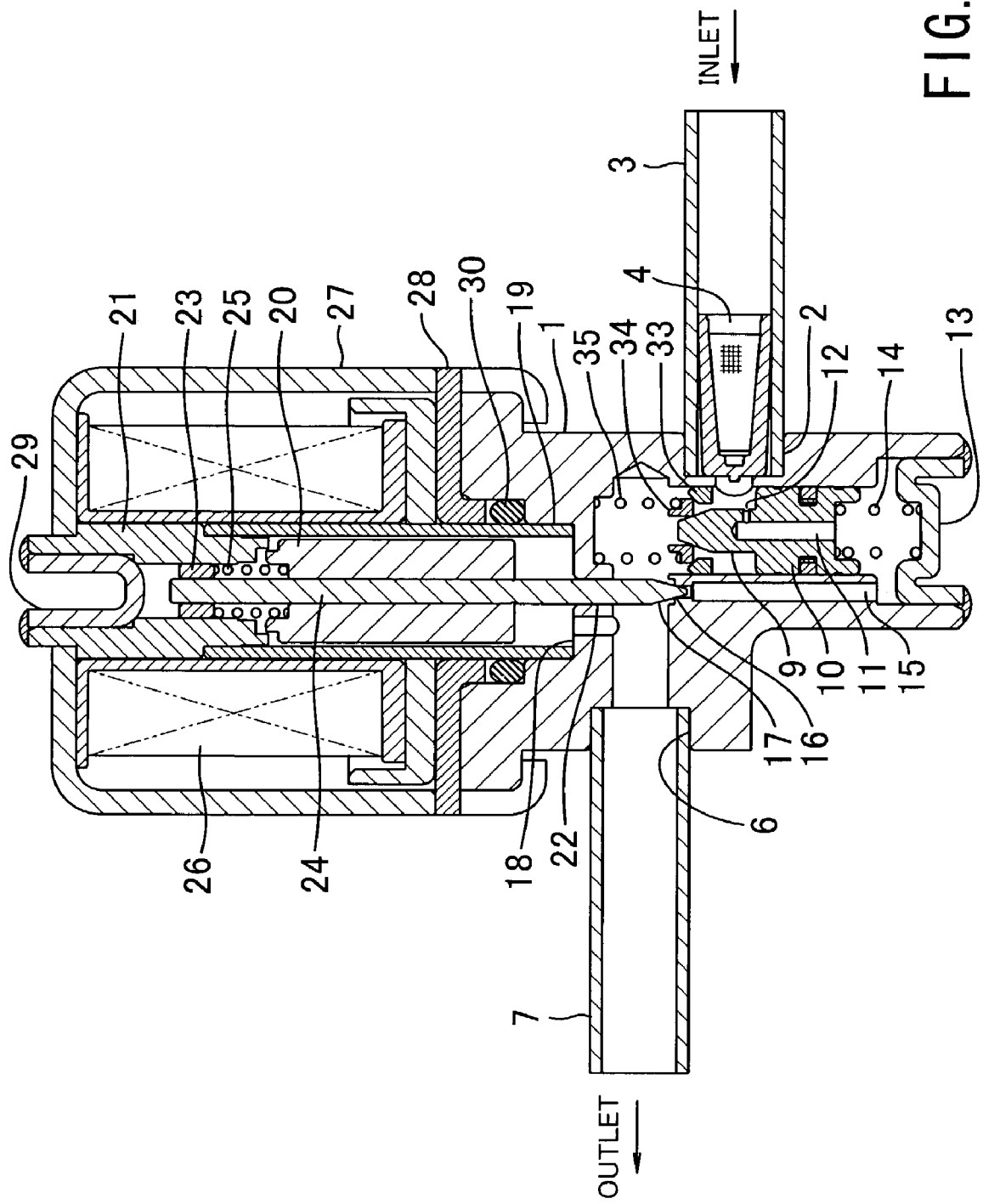
FIG. 4 is a longitudinal sectional view showing the construction of a solenoid control valve according to a fourth embodiment of the invention.

FIG. 4 is a longitudinal sectional view showing the construction of a solenoid control valve according to a fourth embodiment of the invention. In the figure, component parts and elements similar to those of the FIG. 1 solenoid control valve are designated by identical reference numerals, and detailed description thereof is omitted.

The solenoid control valve according to the fourth embodiment is formed by adding a high pressure-avoiding capability to the solenoid control valve according to the first embodiment.

More specifically, a press-fit ring 33 is arranged at an intermediate portion of a refrigerant passage between an inlet port 2 and an outlet port 6, and a plug 34 is arranged in a manner opposed to the press-fit ring 33 from the downstream side. Further, a spring 35 is arranged for urging the plug 34 in a direction of abutting with the press-fit ring 33. Thus, a relief valve is formed which allows a high pressure of refrigerant on the upstream side of the main valve to escape to the downstream side thereof when the pressure of the refrigerant on the inlet port side becomes abnormally high. In this embodiment, the plug 34 serves as a valve element of the relief valve, and the press-fit ring 33 serves as a valve seat of the same.

The spring 35 has a sufficiently larger spring force than a spring 14 arranged below a piston 10, and hence normally, the plug 34 is seated on the press-fit ring 33 such that the press-fit ring 33 and the plug 34 form a valve seat of a main valve.

Now, since the plug 34 is normally seated on the press-fit ring 33, the solenoid control valve according to the fourth embodiment performs completely the same operation as that of the solenoid control valve according to the first embodiment. However, when the pressure of refrigerant introduced into the inlet port 2 has exceeded the urging force of the spring 35, the plug 34 is pushed upward by the pressure of the refrigerant, so that the refrigerant is caused to bypass the main valve to the downstream side thereof. It should be noted that the load of the spring 35 is adjusted by adjusting the amount of insertion of the press-fit ring 33 by press-fitting. As described above, when the pressure of refrigerant on the upstream side of the main valve becomes abnormally high, the relief valve allows the high pressure to escape to the downstream side of the main valve, whereby it is possible to prevent abnormal increase in the pressure of refrigerant.

Next, the necessity of the relief valve will be explained. In the refrigeration cycle of an automotive air conditioning system, refrigerant compressed by a compressor is introduced into a condenser or a gas cooler, where it is condensed or cooled, and then guided into a pressure-reducing device. When a fluorocarbon-based refrigerant is used as the refrigerant, the pressure of the refrigerant does not become abnormally high, since the refrigerant is condensed by the condenser. However, when carbon dioxide is employed as the refrigerant, the refrigerant is not condensed simply by being cooled by the gas cooler, since the refrigerant is compressed to such an extent that the pressure thereof exceeds a critical point or a maximum pressure at which the refrigerant can be condensed. Therefore, particularly at the start of the compressor or on a similar occasion, the pressure of the refrigerant tends to sharply increase. Although the pressure of carbon dioxide refrigerant of the above nature is monitored by a pressure sensor, and the compressor is separated from an output shaft of an engine by a solenoid clutch when an abnormally high pressure of the refrigerant is detected, the separation causes degradation of start ability of the automotive air conditioning system. This inconvenience can be eliminated by adding the high pressure-avoiding capability to the solenoid control valve.

Figure 5:
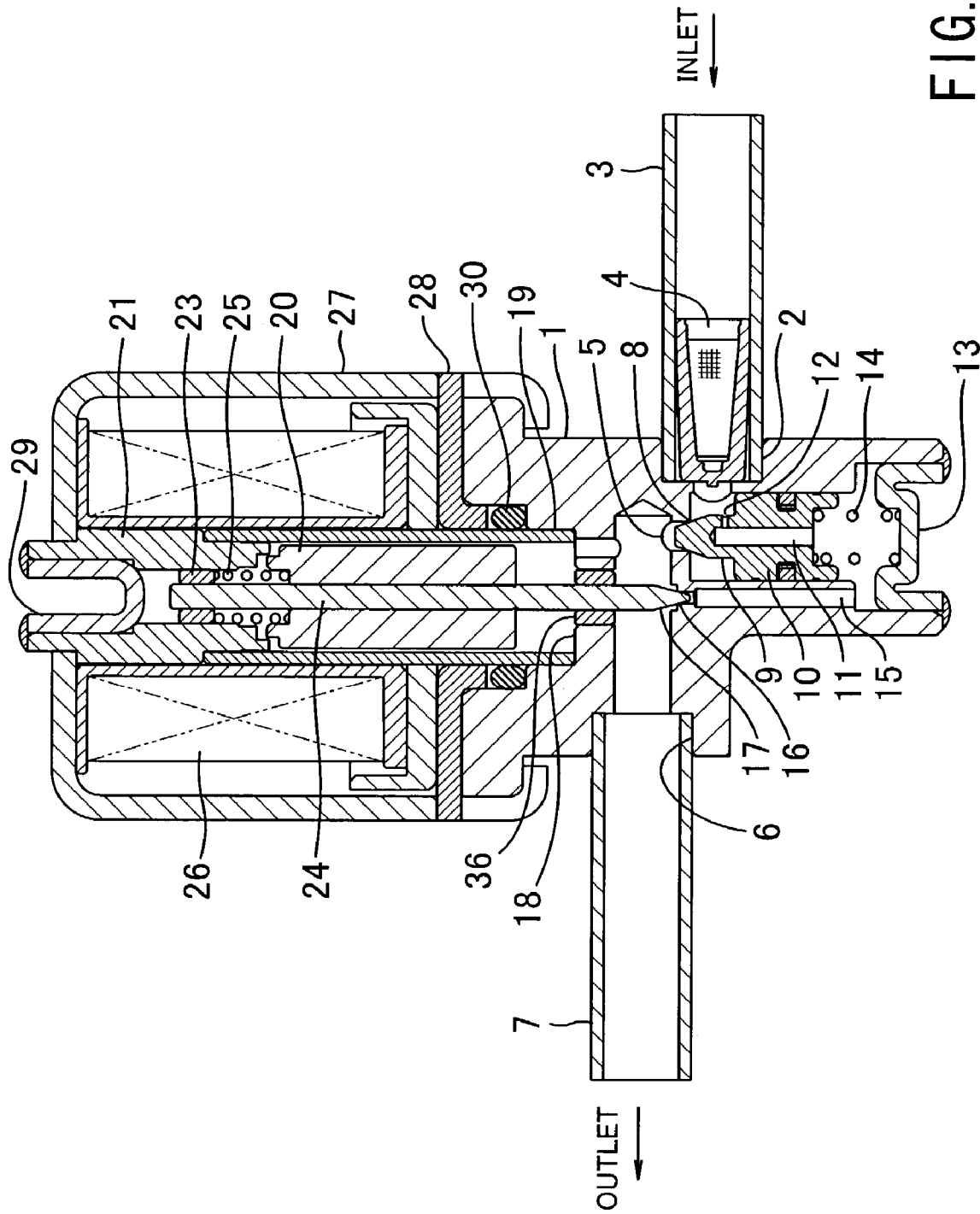
FIG. 5 is a longitudinal sectional view showing the construction of a solenoid control valve according to a fifth embodiment of the invention.

FIG. 5 is a longitudinal sectional view showing the construction of a solenoid control valve according to a fifth embodiment of the invention. In the figure, component parts and elements similar to those of the FIG. 1 solenoid control valve are designated by identical reference numerals, and detailed description thereof is omitted.

In the solenoid control valve according to the first embodiment, the shaft 24 of the solenoid has the, lower end thereof supported by the bearing 22 formed in the body 1, whereas in the solenoid control valve according to the fifth embodiment, a bearing 36 is press-fitted in a hole formed through a body 1, and the lower end portion of a shaft 24 is supported by the bearing 36. The other configurations and the operations of the solenoid control valve according to the fifth embodiment are the same as those of the solenoid control valve according to the first embodiment.

Figure 6:
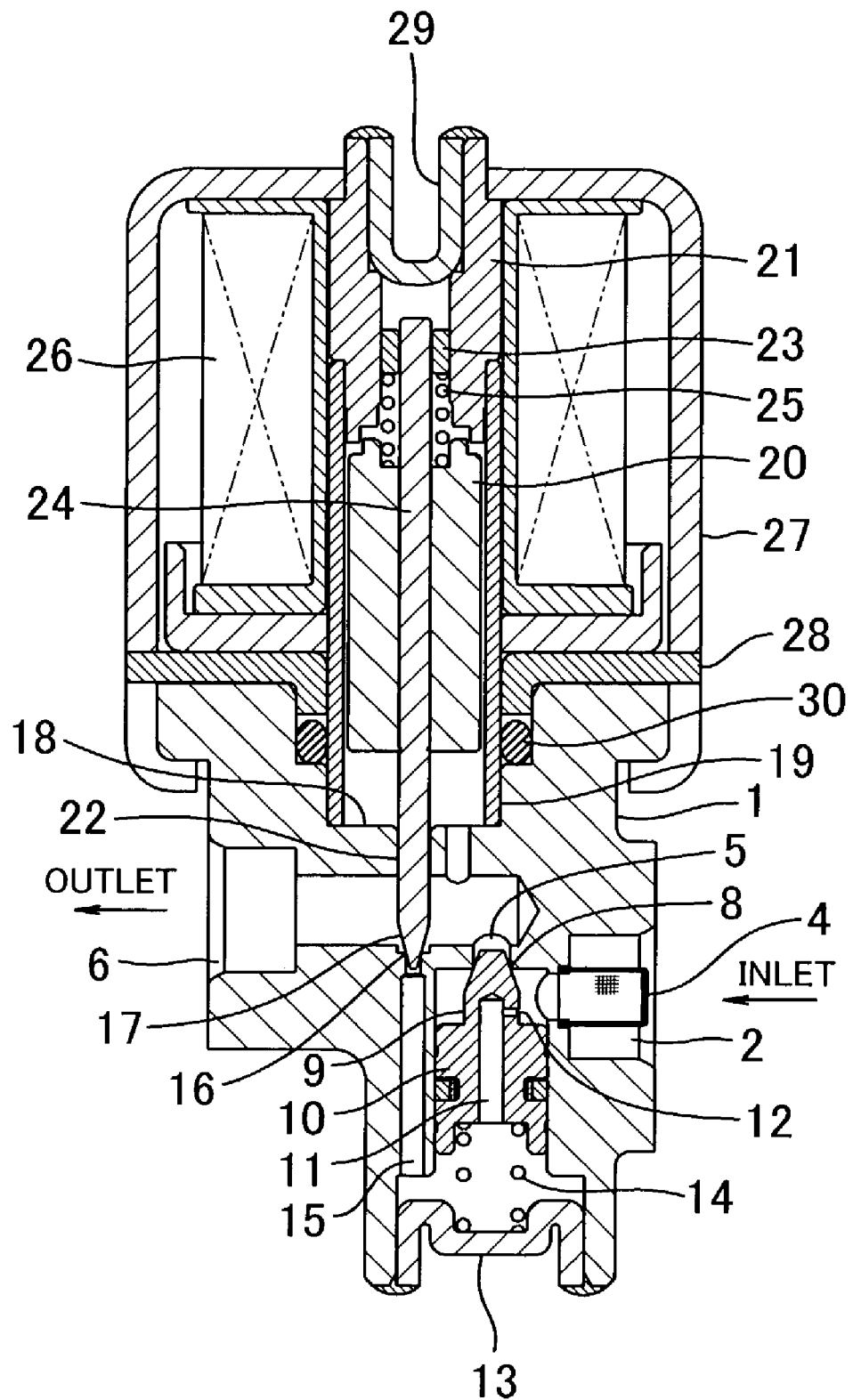
FIG. 6 is a longitudinal sectional view showing the construction of a solenoid control valve according to a sixth embodiment of the invention.

FIG. 6 is a longitudinal sectional view showing the construction of a solenoid control valve according to a sixth embodiment of the invention. In the figure, component parts and elements similar to those of the FIG. 1 solenoid control valve are designated by identical reference numerals, and detailed description thereof is omitted.

In the solenoid control valve according to the first embodiment, the refrigerant piping 3 is welded to the inlet port 2, and the refrigerant piping 7 is welded to the outlet port 6, whereas in the solenoid control valve according to the sixth embodiment, piping joints are modified in construction. More specifically, an inlet port 2 and an outlet port 6 are each configured such that a refrigerant piping having an O ring provided on the periphery thereof in the vicinity of its end can be fitted therein to thereby effect connection thereto. The other configurations and the operations of the solenoid control valve according to the sixth embodiment are similar to those of the solenoid control valve according to the first embodiment.

Figure 7:
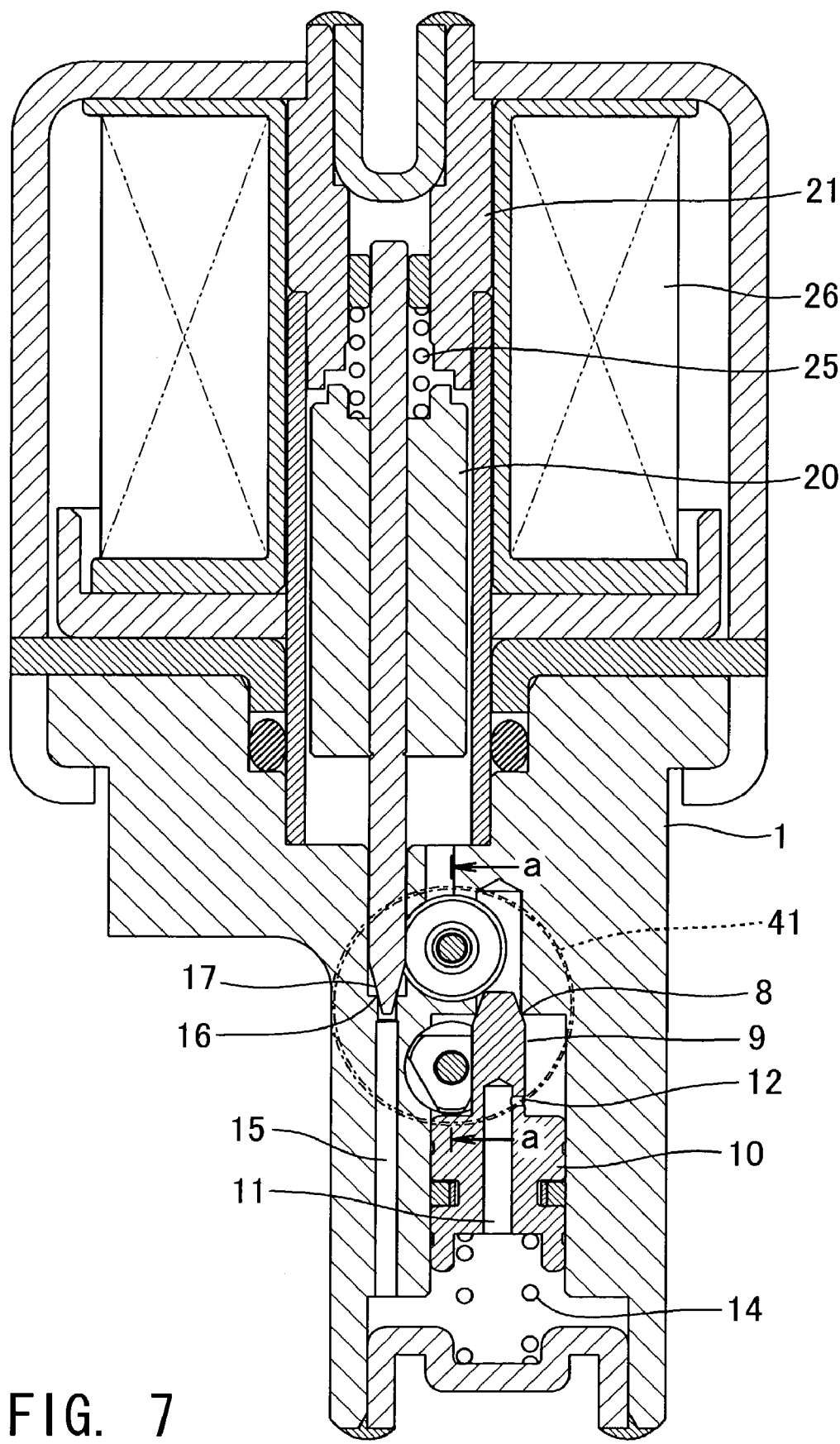
FIG. 7 is a longitudinal sectional view showing the construction of a solenoid control valve according to a seventh embodiment of the invention.
Figure 8:
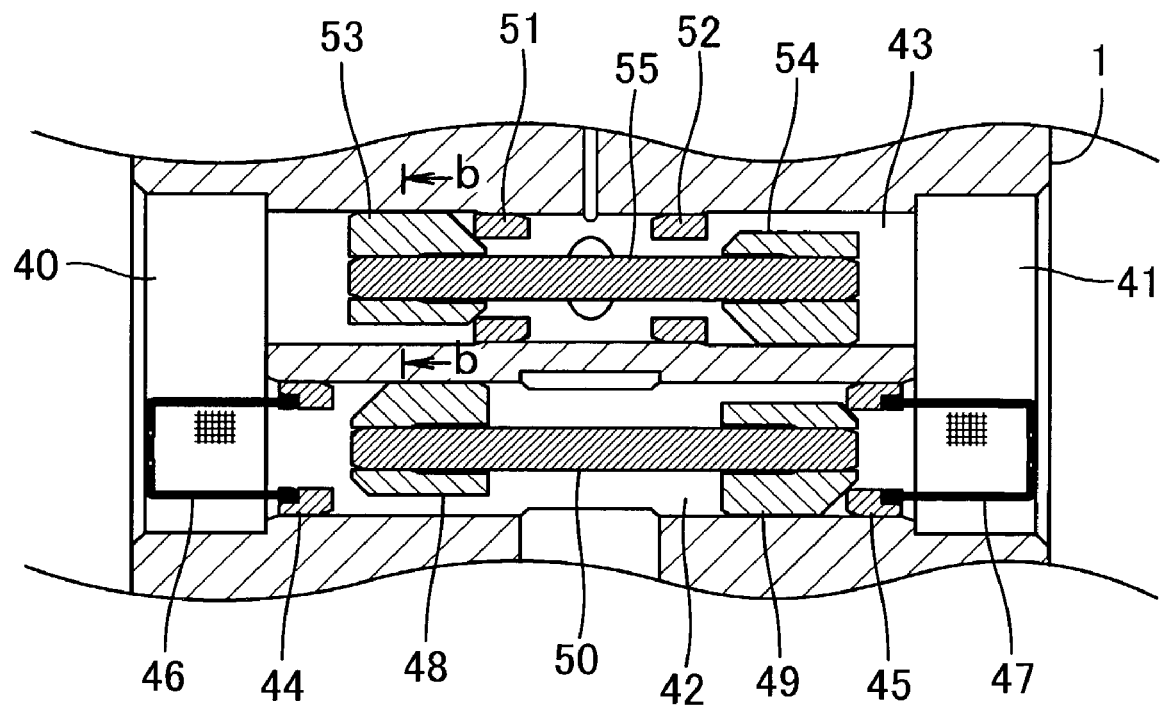
Figure 8:
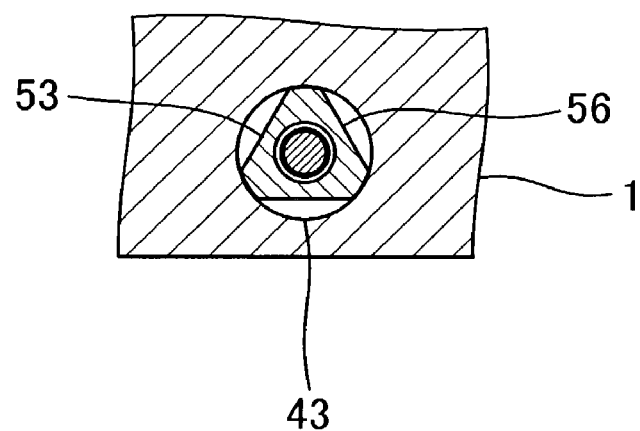
Figure 9:
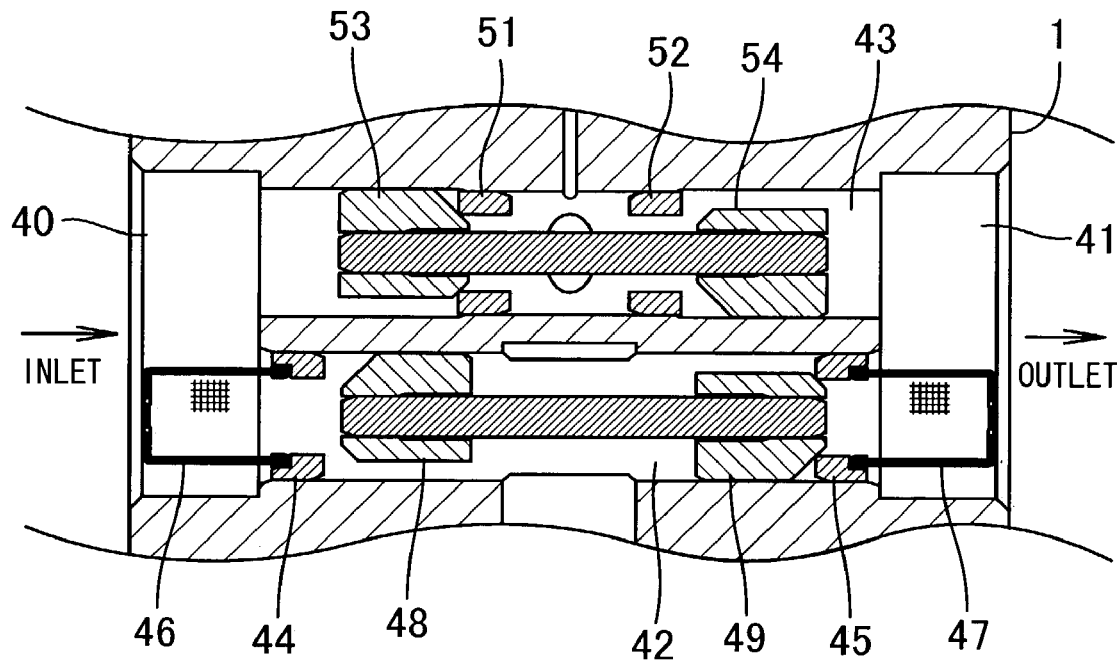
Figure 9:
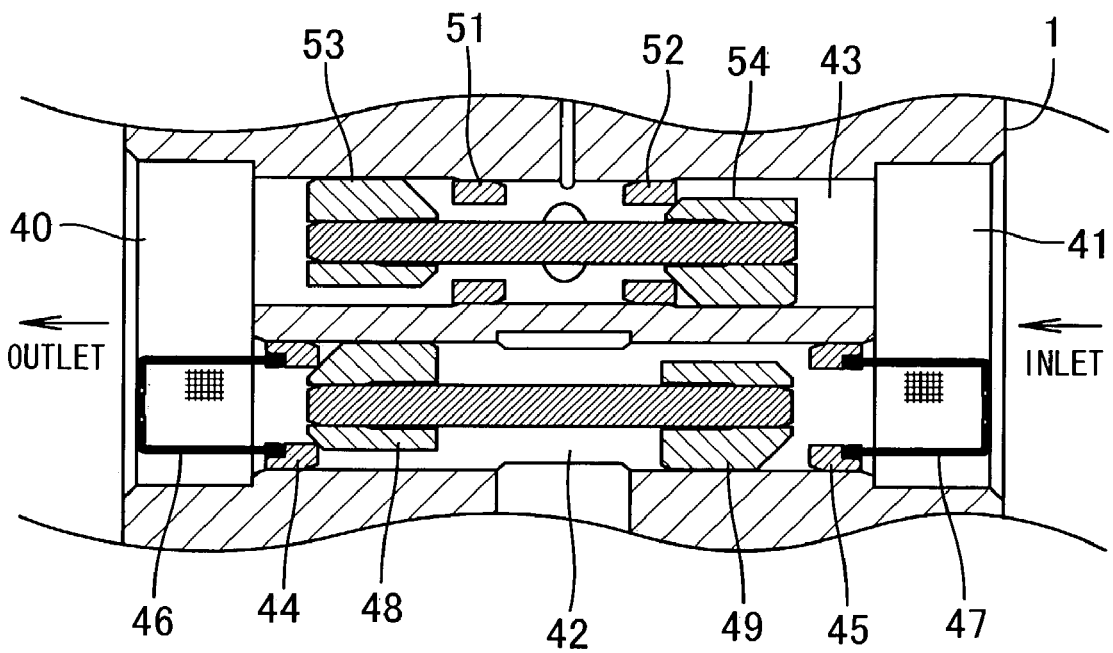

FIG. 7 is a longitudinal sectional view showing the construction of a solenoid control valve according to a seventh embodiment of the invention. FIGS. 8(A) and 8(B) provide cross-sectional views showing essential elements of the FIG. 7 solenoid control valve, in which FIG. 8(A) is a cross-sectional view of the solenoid control valve taken on line a—a of FIG. 7, and FIG. 8(B) is a cross-sectional view of the same taken on line b—b of FIG. 8(A). FIGS. 9(A) and 9(B) provide diagrams which are useful in explaining the operations of the solenoid control valve according to the seventh embodiment of the invention, in which FIG. 9(A) illustrates an operation of the solenoid control valve in a first direction of flow of refrigerant, and FIG. 9(B) shows illustrates an operation of the solenoid control valve in a second direction of flow of refrigerant. It should be noted that in FIG. 7, component parts and elements similar to those of the FIG. 1 solenoid control valve are designated by identical reference numerals, and detailed description thereof is omitted.

The solenoid control valve according to the seventh embodiment has a body 1 including first and second ports 40, 41 which form a refrigerant inlet and a refrigerant outlet, respectively. As shown in detail in FIG. 8(A), an inlet refrigerant passage 42 and an outlet refrigerant passage 43 are formed between the first and second ports 40, 41 in a manner connecting between the first and second ports 40, 41.

The inlet refrigerant passage 42 has valve seats 44, 45 arranged in both ends thereof. The valve seats 44, 45 have strainers 46, 47 fitted therein on the respective sides of the first and second ports 40, 41. In a manner opposed to the valve seats 44, 45, valve elements 48, 49, are arranged, respectively, such that they can move toward and away from the respective valve seats 44, 45 from inside, and at the same time the valve elements 48, 49 are connected to each other by a shaft 50. Thus, the valve elements 48, 49, and the valve seats 44, 45 form two check valves which permit refrigerant to flow inwardly from the both outsides of the inlet refrigerant passage 42, respectively. A space between the valve elements 48, 49 communicates with a chamber on the upstream side of a main valve, defined by a main valve element 8 and a piston 10.

The outlet refrigerant passage 43 has valve seats 51, 52 arranged therein at locations close to a central portion thereof. In a manner opposed to the valve seats 51, 52, valve elements 53, 54, are arranged respectively, such that they can move toward and away from the respective valve seats 51, 52 from outside, and at the same time the valve elements 53, 54 are connected to each other by a shaft 55. Thus, the valve elements 53, 54, and the valve seats 51, 52 form two check valves which permit refrigerant to flow from the inside of the outlet refrigerant passage 43 to the both outsides thereof, respectively. A space between the valve seats 51, 52 communicates with a space on the downstream side of the main valve and a pilot valve.

As shown in FIG. 8(B) which illustrates a cross-section of the valve element 53 as a representative, the valve elements 48, 49, and the valve elements 53, 54 each have three (in the case of the illustrated example) cut-away portions 56 along an outer periphery thereof to form refrigerant passages, whereby the refrigerant passage on the downstream side of each check valve is secured.

In the solenoid control valve constructed as above, first, when a solenoid coil 26 is not energized and refrigerant is not introduced into the first port 40 or the second port 41, as shown in FIG. 7, a main valve element 9 is seated on a main valve seat 8 by a spring 14 to place the main valve in its closed state. A pilot valve element 17 as well is seated on a pilot valve seat 16 by a spring 25 contained in the solenoid to place a pilot valve in its closed state.

Now, for instance, when high-pressure refrigerant is introduced into the first port 40, as shown in FIG. 9(A), the refrigerant pushes the valve element 53 in the outlet refrigerant passage 43 to cause the valve element 53 to be seated on the valve seat 51 therefor, and at the same time, the refrigerant flowing into the inlet refrigerant passage 42 via the strainer 46 pushes the valve element 48 to move the same away from the valve seat 44 therefor. This causes the other valve element 54 in the outlet refrigerant passage 43 to be moved away from the valve seat 52 therefor in a manner interlocked with the seating of the valve element 53, whereby the space in the central portion of the outlet refrigerant passage 43 is communicated with the second port 41. Further, the other valve element 49 in the inlet refrigerant passage 42 is seated on the valve seat 45 in a manner interlocked with the motion of the valve element 48 away from the valve seat 44 therefor, whereby the space in the central portion of the inlet refrigerant passage 42 is disconnected from the second port 41.

As a result, the refrigerant flowing from the first port 40 through the strainer 46 into the inlet refrigerant passage 42 by pushing open the check valve on the first port side of the inlet refrigerant passage 42, passes through the refrigerant passages formed by the cut-away portions 56 formed along the periphery of the valve element 48, into the space defined between the valve elements 48, 49, and thereafter enters the chamber on the upstream side of the main valve. This refrigerant is supplied to the pilot valve via an orifice 12 and refrigerant passages 11, 15. When a differential pressure across the pilot valve exceeds a predetermined value, the refrigerant pushes open the pilot valve element 17, and flows into the space defined between the valve seats 51, 52 in the central portion of the outlet refrigerant passage 43. Since this reduces pressure in a chamber below the piston 10, the piston 10 is moved downward, as viewed in FIG. 7, and the main valve element 9 is moved away from the main valve seat 8 to open the main valve whereby the refrigerant introduced into the first port 40 flows out into the space between the valve seats 51, 52 in the outlet refrigerant passage 43 via the main valve. Further, the refrigerant flows out into the second port 41 through the check valve whose valve element 54 is moved away from the valve seat 52, and the refrigerant passages formed by the cut-away portions 56 formed along the periphery of the valve element 54.

When the outflow of the refrigerant into the second port 41 reduces the pressure of refrigerant on the upstream side of the main valve, the pressure of refrigerant supplied to the pilot valve is also reduced to move the pilot valve element 17 in a valve-closing direction. Since this causes an increase in the pressure of refrigerant introduced into the chamber below the piston 10, the piston 10 is moved upward, as viewed in the figure, and the main valve element 9 is urged accordingly in a valve-closing direction. This causes the main valve to reduce the flow rate of refrigerant to thereby increase the pressure of refrigerant on the upstream side of the main valve. The above operations are repeatedly carried out to thereby control a differential pressure across the main valve to a fixed value. The differential pressure across the main valve at this time, in other words, a maximum differential pressure set to the pilot valve when the solenoid is not energized is determined by the load of the spring 25 within the solenoid, and the load is set depending on a position to which a bearing 23 is press-fitted.

Next, when high-pressure refrigerant is introduced into the second port 41, as shown in FIG. 9(B), the refrigerant pushes the valve element 54 in the outlet refrigerant passage 43 to cause the valve element 54 to be seated on the valve seat 52 therefor, and at the same time, the refrigerant flowing into the inlet refrigerant passage 42 via the strainer 47 pushes the valve element 49 to cause the same to move away from the valve seat 45 therefor. This causes the other valve element 53 in the outlet refrigerant passage 43 to move away from the valve seat 51 therefor in a manner interlocked with the seating of the valve element 54, whereby the space in the central portion of the outlet refrigerant passage 43 is communicated with the first port 40. Further, the other valve element 48 in the inlet refrigerant passage 42 is seated on the valve seat 44 in a manner interlocked with the motion of the valve element 49 away from the valve seat 45 therefor, whereby the space in the central portion of the inlet refrigerant passage 42 is disconnected from the first port 40.

As a result, the refrigerant flowing from the second port 41 through the strainer 47 into the inlet refrigerant passage 42 by pushing open the check valve on the second port side thereof, enters the chamber on the upstream side of the main valve, and is supplied to the pilot valve via the orifice 12 and the refrigerant passages 11, 15. When the differential pressure across the pilot valve exceeds a predetermined value, the refrigerant pushes open the pilot valve element 17, and flows into the first port 40 through the space in the central portion of the outlet refrigerant passage 43, and the check valve on the first port side. This reduces the pressure in the chamber below the piston 10, so that the piston 10 is moved downward, as viewed in FIG. 7, and the main valve element 9 is moved away from the main valve seat 8 to open the main valve whereby the refrigerant flows out into the first port 40 through the space in the central portion of the outlet refrigerant passage 43, and the check valve on the first port side. The following operations are the same as those carried out when the high-pressure refrigerant is introduced into the first port 40.

Further, when the solenoid coil 26 is energized, a plunger 20 is attracted toward a core 21, and the spring force of the spring 25 urging the pilot valve element 17 in the valve-closing direction is reduced to decrease the differential pressure set to the pilot valve. When the value of an electric current energizing the solenoid coil 26 is increased, a force for attracting the plunger 20 toward the core 21 is increased, whereby it is possible to further decrease the differential pressure set to the pilot valve, that is, the differential pressure across the differential pressure valve.

Although the preferred embodiments of the present invention have been described in detail hereinabove, the present invention is not limited to the above particular embodiments. For instance, although in the above first to seventh embodiments, so as to supply reduced-pressure refrigerant to the pilot valve, the restricted passage is formed by forming the orifice 12 in the main valve 9, and the refrigerant passage 11 in the piston 10, this is not limitative, but it is possible to employ an orifice directly formed in the piston 10 such that it extends therethrough. Further, as for the restricted passage, the orifice 12 may be replaced by a groove which is formed in the outer periphery of the piston 10 in the direction of motion thereof, or alternatively, a clearance between the piston 10 and a cylinder which contains the piston 10 in the body 1 in a manner movable forward and backward may be made use of.

As described hereinbefore, according to the present invention, a shaft and a pilot valve element are integrally formed with each other. This makes it possible to reduce the number of component parts. Further, a valve hole of the pilot valve, a hole of a first bearing for supporting one end portion of the shaft of a solenoid, and a fitting hole in which is fitted one end of a sleeve are formed along the same axis in a body. The machining of these holes is carried out on the same member, and hence when the sleeve is fitted in the fitting hole, it is possible to accurately establish the concentricity of the shaft of the solenoid.

Further, a spring for urging a plunger of the solenoid is configured to be received by a second bearing which is arranged in a hollow cylindrical core by press-fitting for supporting the shaft of the solenoid, and at the same time a first spring for urging a main valve element is configured to be received by a second press-fit member, with loads of the springs being adjusted by adjusting the amounts of insertions of the second bearing and the second press-fit member by press-fitting. This makes it possible to dispense with adjusting screws for adjusting the loads of the springs as well as machining of the screws, and thereby reduce machining costs.

An end of a hole in a central portion of the core, and a space containing the first spring are configured to be closed by a first press-fit member, and the second press fit member, respectively. This makes the sealing of the closing portions unnecessary, and hence the use of rubber O rings can be minimized. Accordingly leakage of refrigerant by permeation is reduced, and a time period before the performance of the air conditioner is degraded can be extended.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A solenoid control valve of a pilot-operated type for controlling a flow rate of refrigerant such that a differential pressure of a fluid between an inlet and an outlet of a body containing a main valve becomes equal to a differential pressure set based on a value of an electric current caused to flow through a solenoid, comprising:
   a shaft of the solenoid for actuating a pilot valve and a pilot valve element integrally formed with each other, the shaft having two end portions, a first end portion slidable within and supported by a first bearing arranged on a side of the body containing the main valve, and a second end portion slidable within and supported by a second bearing arranged within the solenoid,
   wherein a valve hole of the pilot valve, a bearing hole of the first bearing, and a fitting hole in which is fitted one end of a sleeve containing a plunger of the solenoid are formed along the same axis in the body, and
   wherein the first bearing is the bearing hole formed in the body, and wherein the second bearing is a press-fit bearing member arranged along an axis of a hollow cylindrical core fitted in the other end of the sleeve.

2. The solenoid control valve according to claim 1, wherein the first bearing further comprises a first press-fit bearing member arranged in die bearing hole formed in the body, and wherein the second bearing is a second press-fit bearing member arranged along an axis of a hollow cylindrical cord fitted in the other end of the sleeve.

3. The solenoid control valve according to claim 1, wherein the first bearing has a clearance between the first bearing and the shaft, the clearance being large enough to prevent the plunger from abutting with the sleeve when the shaft is inclined.

4. The solenoid control valve according to claim 1, wherein an end of a hole through a central portion of the core is closed by a first press-fit member.

5. The solenoid control valve according to claim 4, wherein the first press-fit member is sealed by being welded to the core.

6. The solenoid control valve according to claim 4, wherein the first press-fit member is a ball, the ball being fixed to the core by caulking to end of the hole through the core.

7. The solenoid control valve according to claim 4, wherein a chamber containing a first spring urging a valve element of the main valve in a valve-closing direction is closed by a second press-fit member.

8. The solenoid control valve according to claim 7, wherein the second press-fit member is sealed by being welded to the body.

9. The solenoid control valve according to claim 7, wherein a load of the first spring is adjusted by adjusting an amount of insertion of the second press-fit member by press-fitting.

10. The solenoid control valve according to claim 1, wherein a load of a second spring arranged between the second bearing and the plunger fixed to the shaft, for urging the pilot valve element in a valve-closing direction is adjusted by adjusting an amount of insertion of the second bearing by press-fitting.

11. The solenoid control valve according to claim 1, wherein the solenoid is joined to the body by caulking one end of a yoke surrounding an outside of the solenoid.

12. The solenoid control valve according to claim 1, wherein sealing between the body and the sleeve fitted in the fitting hole is effected by an O ring.

13. The solenoid control valve according to claim 1, wherein sealing between the body and the sleeve fitted in the fitting hole is effected by a packing which is press-fitted by an end of the sleeve when the sleeve is fitted in the fitting hole.

14. The solenoid control valve according to claim 1, comprising a relief valve for causing the fluid introduced into the solenoid control valve to bypass the main valve when a pressure of the fluid is equal to or larger than a predetermined pressure.

15. The solenoid control valve according to claim 14, wherein the relief valve includes a plug which is arranged on a downstream side of the main valve in a manner movable forward and backward in same directions in which the main valve moves forward and backward and has a valve hole formed in a center thereof to form a valve seat of the main valve, a third spring which has an urging force sufficiently larger than that of a first spring for urging a valve element of the main valve in a valve-closing direction and urges the plug in a direction of the main valve, and a press-fit ring which has the plug brought into abutment therewith by the urging force of the third spring on an upstream side of the plug.

16. The solenoid control valve according to claim 15, wherein a load of the third spring is adjusted by adjusting an amount of insertion of the press-fit ring by press-fitting.

17. The solenoid control valve according to claim 1, wherein first piping for introducing the fluid into a first space on an upstream side of the main valve, and second piping for allowing the fluid to flow out from a second space on a downstream side if the main valve are connected to the body by being welded thereto.

18. The solenoid control valve according to claim 1, wherein the body includes an inlet port for fitting therein a first piping for introducing the fluid into a first space on an upstream side of the main valve, and an outlet port for fitting therein a second piping for allowing the fluid to flow out from a second space on a downstream side of the main valve.

19. The solenoid control valve according to claim 1, comprising first and second check valves which are arranged between a first port and a second port, and a first space on an upstream side of the main valve, respectively, for permitting the fluid to flow from this first port and the second port to the first space, and third and fourth check valves which are arranged between the first port and the second port, and a second space on a downstream side of the main valve, respectively, for permitting the fluid to flow from the second space to the first port and the second port, and wherein the main valve is configured for enabling the fluid to flow bi-directionally between the first port and the second port while causing the fluid to flow in one direction.

20. The solenoid control valve according to claim 2, wherein the first bearing has a clearance between the first bearing and the shaft, the clearance being large enough to prevent the plunger from abutting with the sleeve when the shaft is inclined.

21. The solenoid control valve according to claim 2, wherein an end of a hole through a central portion of the core is closed by a first press-fit member.

22. The solenoid control valve according to claim 2, wherein a load of a second spring arranged between the second bearing and the plunger fixed to the shaft, for urging the pilot valve element in a valve-closing direction is adjusted by adjusting an amount of insertion of the second bearing by press-fitting.

* * * * *